(12) United States Patent
Cohen

(10) Patent No.: US 9,823,339 B2
(45) Date of Patent: Nov. 21, 2017

(54) PLURAL ANODE TIME-OF-FLIGHT SENSOR

(75) Inventor: David Cohen, Nesher (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1321 days.

(21) Appl. No.: 12/975,174

(22) Filed: Dec. 21, 2010

(65) Prior Publication Data

US 2012/0154573 A1   Jun. 21, 2012

(51) Int. Cl.
  *G01S 7/486* (2006.01)
  *G01S 7/481* (2006.01)
  *G01S 17/89* (2006.01)

(52) U.S. Cl.
  CPC ............ *G01S 7/486* (2013.01); *G01S 7/4816* (2013.01); *G01S 7/4863* (2013.01); *G01S 17/89* (2013.01)

(58) Field of Classification Search
  CPC ........ G01S 17/89; G01S 7/4816; G01S 7/486; G01S 7/4863
  USPC .................................. 348/135, 169
  See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |

(Continued)

FOREIGN PATENT DOCUMENTS

| | | |
|---|---|---|
| CN | 101421848 A | 4/2009 |
| CN | 201254344 B | 6/2010 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Anner N Holder
(74) *Attorney, Agent, or Firm* — Alleman Hall Creasman & Tuttle LLP

(57) ABSTRACT

A time of flight (TOF) camera comprises a light source for illuminating an object with light and a plurality of light-sensitive pixels for collecting return image light reflected by the object. Further, each light-sensitive pixel of the TOF camera may comprise a photoelectric cathode for generating electrons responsive to return image light incident on the pixel and a plurality of anodes for collecting electrons generated at the photoelectric cathode.

19 Claims, 6 Drawing Sheets

(56) References Cited

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,471,051 A | 11/1995 | Niigaki et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,602,397 A * | 2/1997 | Pitts ............ H01J 47/02 250/374 |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,677,560 A * | 10/1997 | Zimmer ............ G01L 1/148 257/415 |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,507,365 B1 * | 1/2003 | Inoue et al. .......... 348/296 |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 * | 4/2007 | Braun et al. .......... 348/301 |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,355,648 B1 | 4/2008 | Braun et al. |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

(56) References Cited

U.S. PATENT DOCUMENTS

| | | | |
|---|---|---|---|
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2001/0003013 | A1 | 6/2001 | Katsumata |
| 2007/0091175 | A1 | 4/2007 | Iddan et al. |
| 2008/0026838 | A1 | 1/2008 | Dunstan et al. |
| 2009/0072122 | A1* | 3/2009 | Tada et al. ................. 250/208.1 |
| 2010/0039546 | A1 | 2/2010 | Cohen et al. |
| 2010/0134735 | A1* | 6/2010 | Nakamura et al. ........... 349/116 |
| 2010/0171813 | A1 | 7/2010 | Pelman et al. |
| 2011/0074274 | A1* | 3/2011 | Tang et al. .................... 313/296 |

FOREIGN PATENT DOCUMENTS

| | | |
|---|---|---|
| CN | 101904165 A | 12/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2008088481 A1 | 7/2008 |
| WO | 2009063472 A1 | 5/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Ringbeck, et al., "A 3D Time of Flight Camera for Object Detection", Retrieved at <<http://www.ifm-electronic.com/obj/O1D_Paper-PMD.pdf >>, Optical 3-D Measurement Techniques, Jul. 12, 2007, pp. 10.

Kawakita, et al., "Axi-Vision Camera ~real-time distance-mapping camera!", Retrieved at <<http://citeseerx.ist.psu.edu/viewdoc/download?doi=10.1.1.113.2293&rep=rep1&type=pdf >>,Aug. 1, 2000 vol. 39, No. 22 Applied Optics, pp. 3931-3939.

State Intellectual Property Office of China, Office Action of Chinese Patent Application No. 201110431512.X, dated Sep. 23, 2013, 13 pages.

\* cited by examiner

PLURAL ANODE TIME-OF-FLIGHT SENSOR

BACKGROUND

Time-of-flight (TOF) cameras collect distance data from a scene. However, it can be difficult to collect accurate distance data from moving objects.

SUMMARY

A light-sensitive pixel includes an evacuated cavity formed in an insulating substrate. The light-sensitive pixel further includes a photoelectric cathode for generating electrons responsive to light incident on the light-sensitive pixel. The photoelectric cathode is located in the evacuated cavity. The light-sensitive pixel also includes a plurality of anodes for collecting electrons generated at the photoelectric cathode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
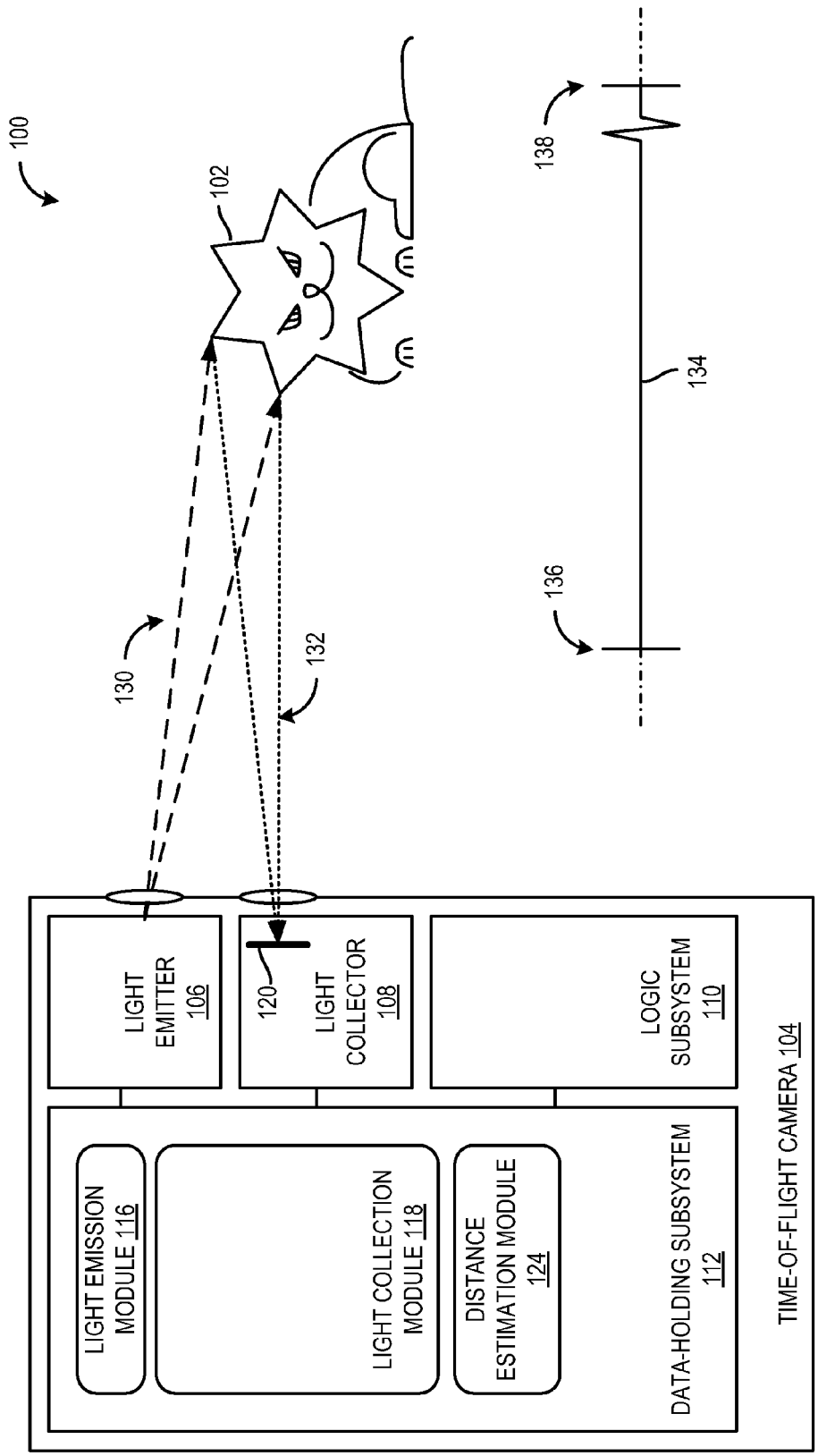
FIG. 1 schematically shows an example time-of-flight (TOF) camera in an example operating environment according to an embodiment of the present disclosure.

Time-of-flight (TOF) cameras capture distance data. Thus, a three-dimensional image of an object captured by a TOF camera may be generated based on the distance data collected. In a typical TOF camera, light pulses of any suitable wavelength (e.g., one or more wavelengths in an infrared, near infrared, visible, and/or ultraviolet region) are transmitted from the TOF camera to an object. The image light pulses illuminate and are reflected by the object. The return image light is received at a photosensitive surface of the TOF camera. By measuring the time at which the return image light is received at the photosensitive surface, the TOF camera may estimate the distance of various features of the object from the camera. Because light is typically returned relatively sooner from a near feature than from a far feature, time-dependent measurement and quantification of the return image light may provide distance information about the object's features.

It can be more difficult to generate intense light pulses for illuminating the distant object than to generate a train of light pulses comparatively less intense. Thus, some TOF cameras perform the time-dependent measurement by a "range gating" technique. In typical range gating approaches, collection of light at the photosurface is divided (or "gated") into plural discrete gating events of known duration. By integrating the light received from multiple pulses at the photosurface, the TOF camera may better distinguish return image light from ambient light, potentially improving the accuracy of the distance data.

Further, some TOF cameras may intermittently transmit pulses of normalization light that are reflected from the object and collected at the TOF camera. The collected return normalization light measurement may be used to calibrate the target object's reflectivity light from the light collected during the gated time periods.

However, a number of factors can adversely affect the accuracy of the distance measurements described above. For example, image light and normalization light are often imaged in different frames and acquired at different times. The acquisition times for the two events may be separated by a delay time at least equal to a time for reading and resetting each frame. For an object in motion, the delay time may cause a mismatch where the same pixel receives return image light and return normalization light from different features of an object or scene rather than from the same feature. Mismatches may also result from situations where the same pixel registers return image light and return normalization light from the same feature at different distances from the camera.

Consequently, the distance estimation derived from a mismatch may be faulty. Further, for some TOF camera systems, the gated time periods may have very short durations that may result in an inaccurate distance estimation. Light pulse widths, the short durations of exposure periods, and typical quantum efficiencies on the order of about 10% that characterize conventional photosurfaces used to acquire measurements of gated light, may result in relatively large errors in the measurements due to shot noise. Other distance estimation errors may result from reduction in the modulation ratio between the on and off states of the photosurface.

Accordingly, various embodiments of light-sensitive pixels for TOF cameras and methods for operating such pixels are provided herein that reduce or substantially eliminate delay times between successive gating time periods and/or normalization time periods, such that the accuracy of the distance estimation may be comparatively increased.

FIG. 1 schematically shows an example operating environment 100 for an embodiment of a TOF camera 104. In the example shown in FIG. 1, TOF camera 104 is configured to provide image and distance information for object 102 within a predetermined distance range 134. Distance range 134 includes the region of space in which distance information may be accurately generated by TOF camera 104. Boundaries for distance range 134 are illustrated as a near end point 136 and a far end point 138. The boundaries are defined by pulse and gate widths and delay between a time at which a pulse is transmitted and a subsequent time at which the camera is gated on for a gated time period.

As shown in FIG. 1, TOF camera 104 includes a light emitter 106 for emitting pulses of light 130 that illuminates object 102. In some embodiments, light emitter 106 may be controlled by a light emission module 116. For example, light emission module 116 may control one or more of pulse timing, pulse width, and wavelength of light 130.

Return image light 132 is reflected from object 102 and is collected at photosurface 120 of light collector 108. Photosurface 120 comprises one or more light-sensitive pixels (not shown) for collecting return image light 132. In some embodiments, light collector 108 may be controlled by a light collection module 118. In such embodiments, light collection module 118 may control one or more of light gating events and light normalization events for light-sensitive pixels included in photosurface 120.

In the example shown in FIG. 1, distance estimation module 124 receives return image light and/or normalization light information from light collector 108. Distance estimation module 124 generates distance information about object 102 based on light emission information and light collection information provided by light emission module 116 and light collection module 118.

Figure 2:
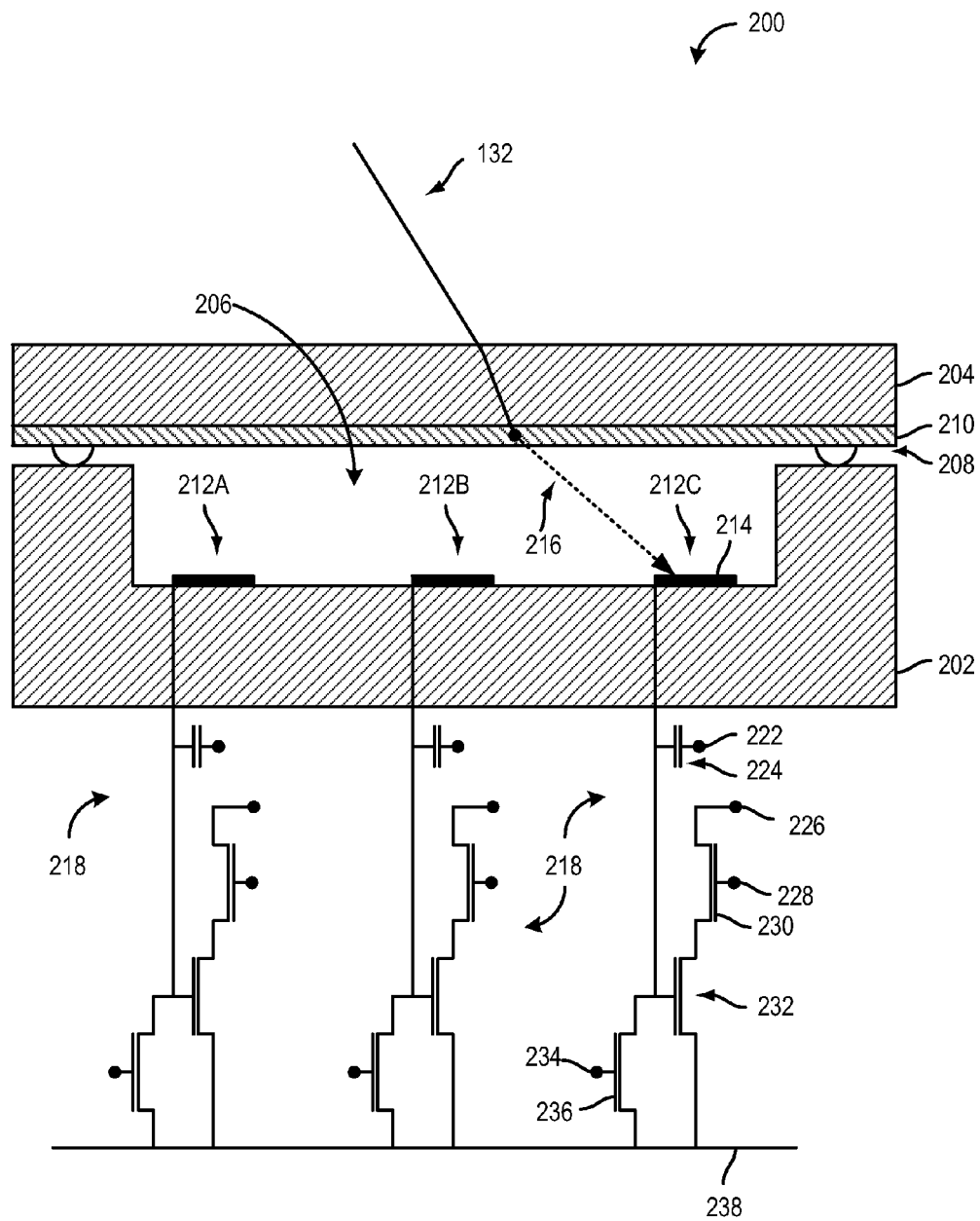
FIG. 2 schematically shows an example light-sensitive pixel included in a TOF camera according to an embodiment of the present disclosure.

As described above, photosurface 120 includes one or more light-sensitive pixels for collecting return image light and return normalization light. FIG. 2 schematically shows a single light-sensitive pixel 200. As shown in the example depicted in FIG. 2, light-sensitive pixel 200 includes a substrate 202 in which a cavity 206 is formed. In one non-limiting example, cavity 206 may be approximately 4 microns wide and approximately 2 microns deep.

In some embodiments, substrate 202 may be fabricated from an insulating material. Example materials for substrate 202 include, but are not limited to, undoped silicate glass (USG) and doped or undoped silicon, though it will be appreciated that any suitable substrate material may be employed without departing from the scope of the present disclosure.

The example shown in FIG. 2 also depicts an optical component 204 disposed above cavity 206. In conjunction with seal 208, optical component 204 hermetically seals cavity 206. Seal 208 may be formed from any suitable material; for example, in some embodiments, seal 208 may include a soft metal. One example material for seal 208 may include indium, though it will be appreciated that seal 208 may include various suitable low-volatility polymeric materials in some embodiments. While the example shown in FIG. 2 depicts optical component 204 as sealing cavity 206 for a single light-sensitive pixel 200, it will be appreciated that in some embodiments, two or more light-sensitive pixels 200 may be sealed as a unit by optical component 204 and seal 208.

Optical component 204 includes a photoelectric cathode 210 for generating photoelectrons 216 responsive to light incident on light-sensitive pixel 200. Optical component 204 may be optically transparent in some embodiments, so that light in a visible range of wavelengths may pass through optical component 204. Additionally or alternatively, in some embodiments, optical component 204 may be configured to allow light in an infrared and/or ultraviolet range of wavelengths to pass.

In some embodiments, photoelectric cathode 210 may include a layer of photoelectric material configured to generate photoelectrons 216 in response to incident return image light 132. Example photoelectric materials include, but are not limited to, GaAs, CsO, and AlGaAs. However, it will be appreciated that any suitable photoelectric material may be employed without departing from the scope of the present disclosure. In such embodiments, cavity 206 may be evacuated so that photoelectrons 216 have a sufficiently long mean free path to reach a portion of cavity 206 wherein a plurality of anodes 212 are disposed. In the example shown in FIG. 2, photoelectric cathode 210 is included in cavity 206 and comprises a layer of photoelectric material deposited on an evacuated side of optical component 204.

As described above, cavity 206 includes a plurality of anodes 212 for collecting photoelectrons 216 generated at photoelectric cathode 210. In the example shown in FIG. 2, each anode 212 includes an electrode 214 electrically connected to a collector circuit 218. In response to selection of a particular anode 212 by light collection module 118 of FIG. 1, a respective collector circuit 218 collects photoelectrons 216 and outputs a resulting charge to the light collection module via output node 226.

Electrodes 214 are spaced from photocathode 210 according to one or more predetermined design parameters for light-sensitive pixel 200. It is believed that increasing the spacing between electrodes 214 and photocathode 210 may reduce capacitive coupling between electrodes 214 and photocathode 210, potentially increasing a speed at which light-sensitive pixel 200 may switch between each anode 212. Further, as described above, increasing the spacing between electrodes 214 and photocathode 210 may also reduce a probability that photoelectrons 216 may reach electrodes 214, potentially decreasing the charge yield at electrodes 214. However, it will be appreciated that the charge yield may also potentially be reduced as the spacing between electrodes 214 and photocathode 210 is reduced, as a smaller portion of photoelectrons 216 emitted from photocathode 210 may have a suitable trajectory to reach each electrode 214. Thus, suitable spacing may be influenced by an electrode bias voltage during collection, photocathode cross-section, and vacuum level within cavity 206. In one non-limiting example, photocathode 210 may be 2 microns from electrodes 214.

In the example shown in FIG. 2, each collector circuit 218 includes a gate input node 222 for biasing respective electrode 214. For example, FIG. 2 depicts a gate capacitor 224 by which a positive charge may be induced at electrode 214 relative to photocathode 210. Electrode 214 generates a field that attracts photoelectrons 216 for collection. Applying power from power supply 238 to selector node 228 selectively switches current flow through an individual collector circuit 218. Thus, in the embodiment shown in FIG. 2, a particular collector circuit 218 may be selectively activated in response to a circuit selection signal received from a light collection module (e.g., light collection module 118 of FIG. 1) and power received from power supply 238.

As shown in the example depicted in FIG. 2, powering selector node 228 turns on output transistor 230, connecting output node 226 to electrode 214 via amplifier 232. Thus, charge collected at electrode 214 may be amplified and output from collector circuit 218. Because the number of photoelectrons 216 generated at photocathode 210 is proportional to the amount of return image light 132 received at photocathode 210, the amount of charge collected at electrode 214 and output from collector circuit 218 is also proportionate to the amount of return image light 132 received at light-sensing pixel 200.

In some embodiments, collector circuit 218 may also include a reset node 234 for resetting anode 212. In the example shown in FIG. 2, application of a reset signal to reset node 234 turns on reset transistor 236, resetting anode 212 to a supply voltage of power supply 238.

It will be appreciated that light-sensitive pixel 200 may be fabricated in any suitable manner without departing from the scope of the present disclosure. For example, in some embodiments, light-sensitive pixel 200 may be fabricated on a silicon substrate. In such embodiments, one or more subtractive processes may be employed to pattern and etch cavity 206 on a first side of the silicon substrate. Further, a through-silicon via may be etched connecting the first side of the silicon substrate to a second, opposite side of the silicon substrate, on which a portion of collector circuit 218 may be formed via various deposition and patterning techniques. In some embodiments, a suitable metallization process may be used to fill the through-silicon via and form electrodes 214. It will be appreciated that, in some embodiments, the first and second sides of the silicon substrate may refer to two silicon substrates initially separated and subsequently bonded via a suitable substrate bonding technique. Finally, as explained above, a suitable deposition process may be used to form photocathode 210 on optical component 204, which may then be bonded to the silicon substrate above cavity 206.

Figure 3:
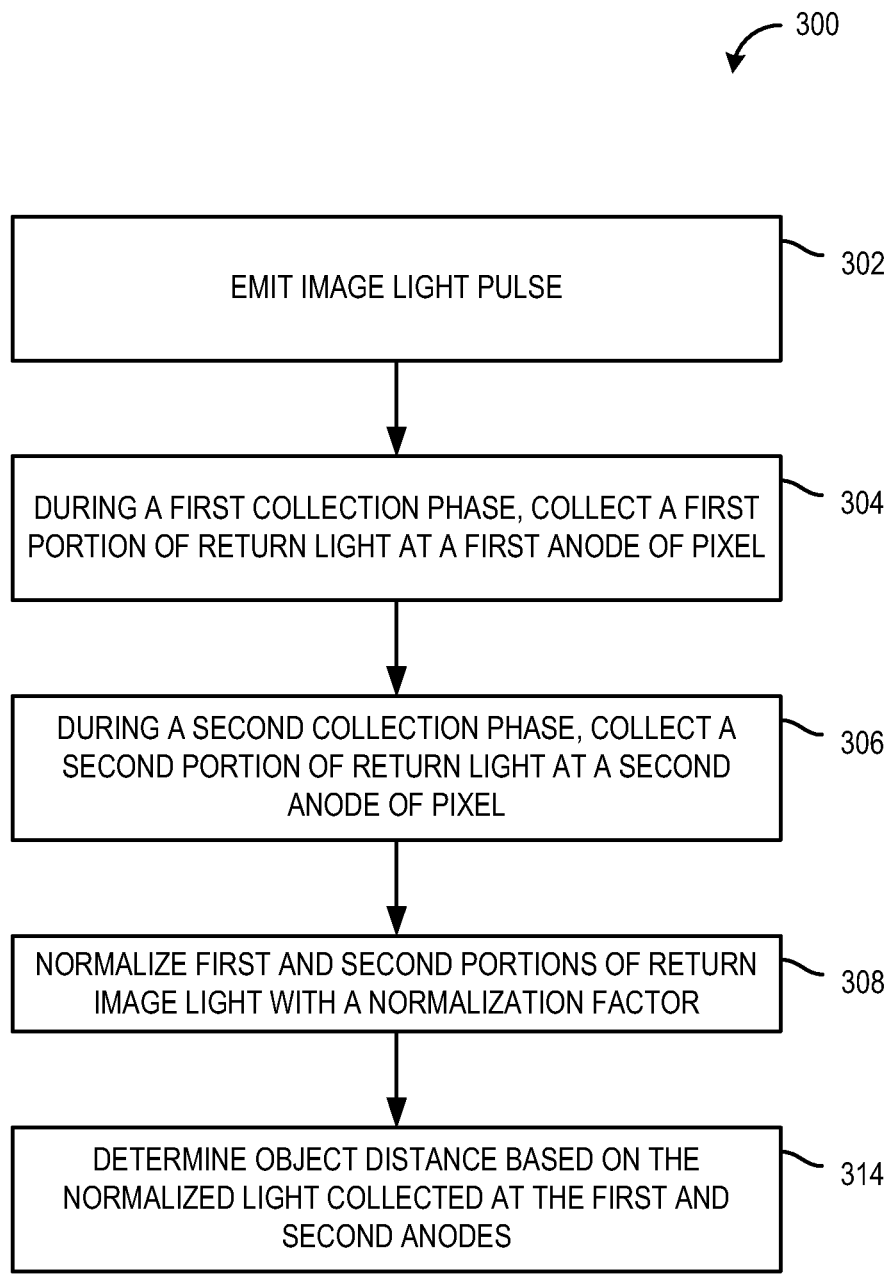
FIG. 3 shows a method for operating a TOF camera according to an embodiment of the present disclosure.

FIG. 3 shows a method 300 for operating a time-of-flight camera in accordance with embodiments of the present disclosure. While method 300 may be used to operate the hardware embodiments described above, it will be appreciated that method 300 may be used to operate any compatible time-of-flight camera including any compatible plural anode light-sensitive pixel.

Figure 4:
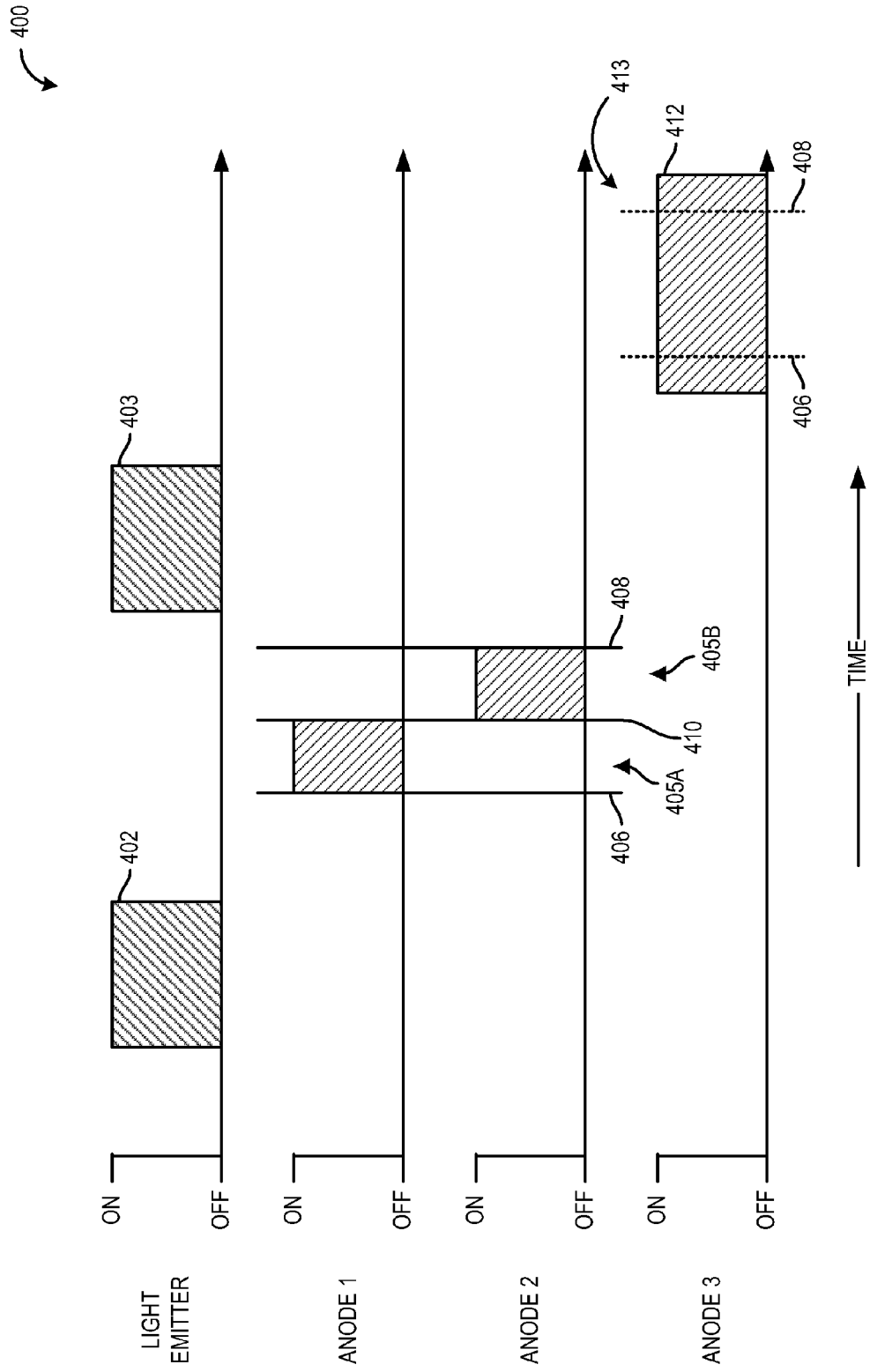
FIG. 4 schematically shows a timing diagram for operating a TOF camera according to an embodiment of the present disclosure.

As shown in FIG. 3, method 300 comprises, at 302, emitting an image light pulse from a light source of the camera, the light source configured to illuminate an object feature. For example, FIG. 4 shows an example time sequence 400 depicting an image light pulse 402 emitted from a light emitter and gating events including return image light collection phases performed by a plurality of anodes included in a single light-sensitive pixel.

Turning back to FIG. 3, at 304, method 300 comprises, during a first collection phase, collecting a first portion of return image light at a first anode of a light-sensitive pixel, the return image light comprising image light reflected by the object feature illuminated at least in part by the image light pulse. In the example shown in FIG. 4, a first portion of return image light is collected during first return image light collection phase 405A by turning the first anode on during first return image light collection phase 405A.

In some embodiments, a start time for first return image light collection phase 405A may be based on a predetermined near end point of a distance range for the TOF camera. In the example shown in FIG. 4, start time 406 corresponds to the near end point of a boundary of the distance range for the TOF camera. In particular, start time 406 is set to follow image light pulse 402 by a duration that corresponds to the estimated round trip time of image light pulse 402 from the light emitter to an object at near end point 136 of FIG. 1 and back to the collector.

Turning back to FIG. 3, at 306, method 300 comprises, during a second collection phase, collecting a second portion of the return image light at a second anode of the light-sensitive pixel. In the example shown in FIG. 4, a second portion of return image light is collected during second return image light collection phase 405B by turning the second anode on during the second return image light collection phase 405B.

In some embodiments, an end time for a second return image light collection phase may be based on a predetermined far end point of the distance range. In the example shown in FIG. 4, end time 408 corresponds to the far end point of the distance range for the TOF camera. In particular, end time 408 is set to follow image light pulse 402 by a duration that corresponds to the estimated round trip time of image light pulse 402 from the light emitter to an object at far end point 138 of FIG. 1 and back to the collector.

In some embodiments, the last collection phase may immediately follow the first collection phase. In the example shown in FIG. 4, the first anode is turned off and the second anode is turned on concurrently at anode switch time 410. By immediately transitioning between anodes, return image light may be collected without interruption between start time 406 and end time 408. While the example shown in FIG. 4 depicts two return image light collection phases, it will be appreciated that any suitable number of gating time periods may be employed without departing from the scope of the present disclosure.

Continuing with FIG. 3, at 308, method 300 comprises normalizing the first and second portions of the return image light with a normalization factor. The normalization factor may account for the reflectivity of the object. The normalization may be accomplished by dividing one of the collecting phases by the sum of both collecting phases.

Figure 5:
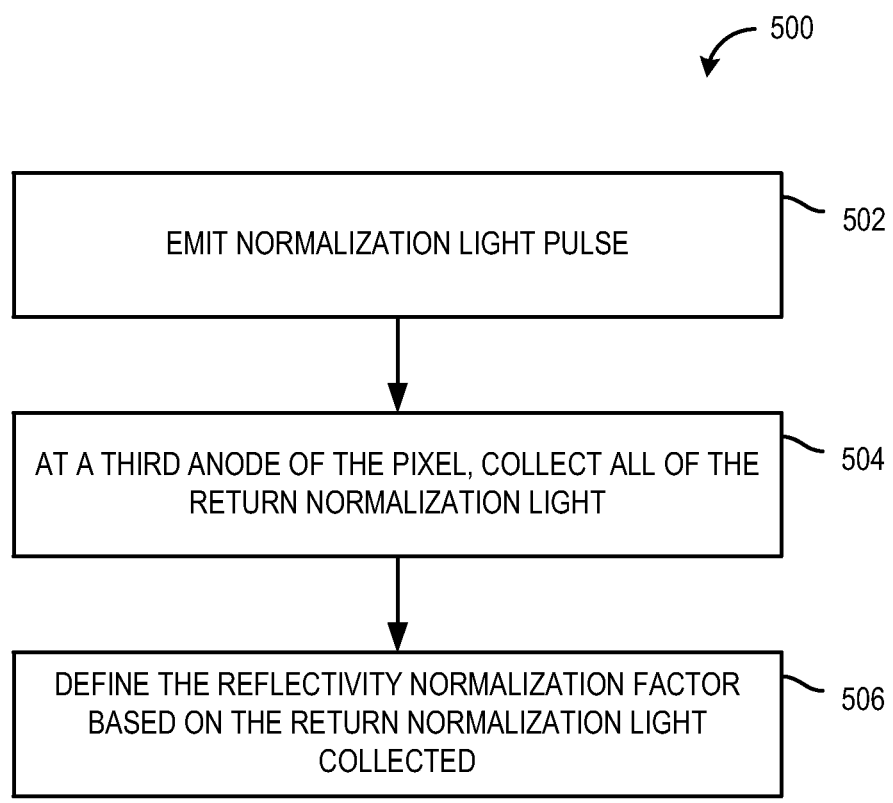
FIG. 5 shows a method for generating a normalization factor for a TOF camera according to an embodiment of the present disclosure.

In some embodiments, the normalization factor may be generated dynamically at each depth frame by the TOF camera. FIG. 5 shows a method 500 for dynamically generating a reflectivity normalization factor at each depth frame. Method 500 comprises, at 502, emitting a normalization light pulse.

In the example shown in FIG. 4, a normalization light pulse 403 is emitted by the light emitter after emission of image light pulse 402. As depicted in FIG. 4, normalization light pulse 403 and image light pulse 402 have the same pulse width and intensity. Thus, the amount of light may be quantitatively the same between the two light pulses. This may provide an approach to scaling the amount of light collected during the return image light collection phases.

Returning to FIG. 5, at 504, method 500 comprises, at a third anode of the light-sensitive pixel (e.g., anode 212C of FIG. 2), collecting all of the return normalization light. In the example shown in FIG. 4, the third anode is turned on during return normalization light collection phase 413. For illustrative purposes, FIG. 4 shows return normalization light collection phase 413 with reference to start time 406 and end time 408, so that all of the return normalization light 412 may be collected, even if portions of the object being imaged are outside of the boundaries of the camera's range.

Continuing with FIG. 5, method 500 comprises, at 506, defining the reflectivity normalization factor based on the return normalization light collected. For example, in some embodiments, the reflectivity normalization factor may be defined as the total return normalization light 412 collected during return normalization light collection phase 413. This process may be dynamically repeated at each depth frame.

Method 300 may additionally or alternatively comprise compensating for ambient light to comparatively reduce measurement errors resulting in part from the influence of ambient light. In some embodiments, ambient light compensation may be achieved by collecting ambient light during a time when a light pulse is not emitted. In this way, the relative amount of ambient light present may be determined. Ambient light compensation is not always required. For example, when the integration time is short enough, the ambient light is low enough, and the accuracy requirements are relaxed enough, there might not be a need to compensate for the ambient light. When ambient light compensation is performed, a signal is collected without operating the illumination. This can be done using any suitable approach, including using anode 212C of FIG. 2.

Figure 6:
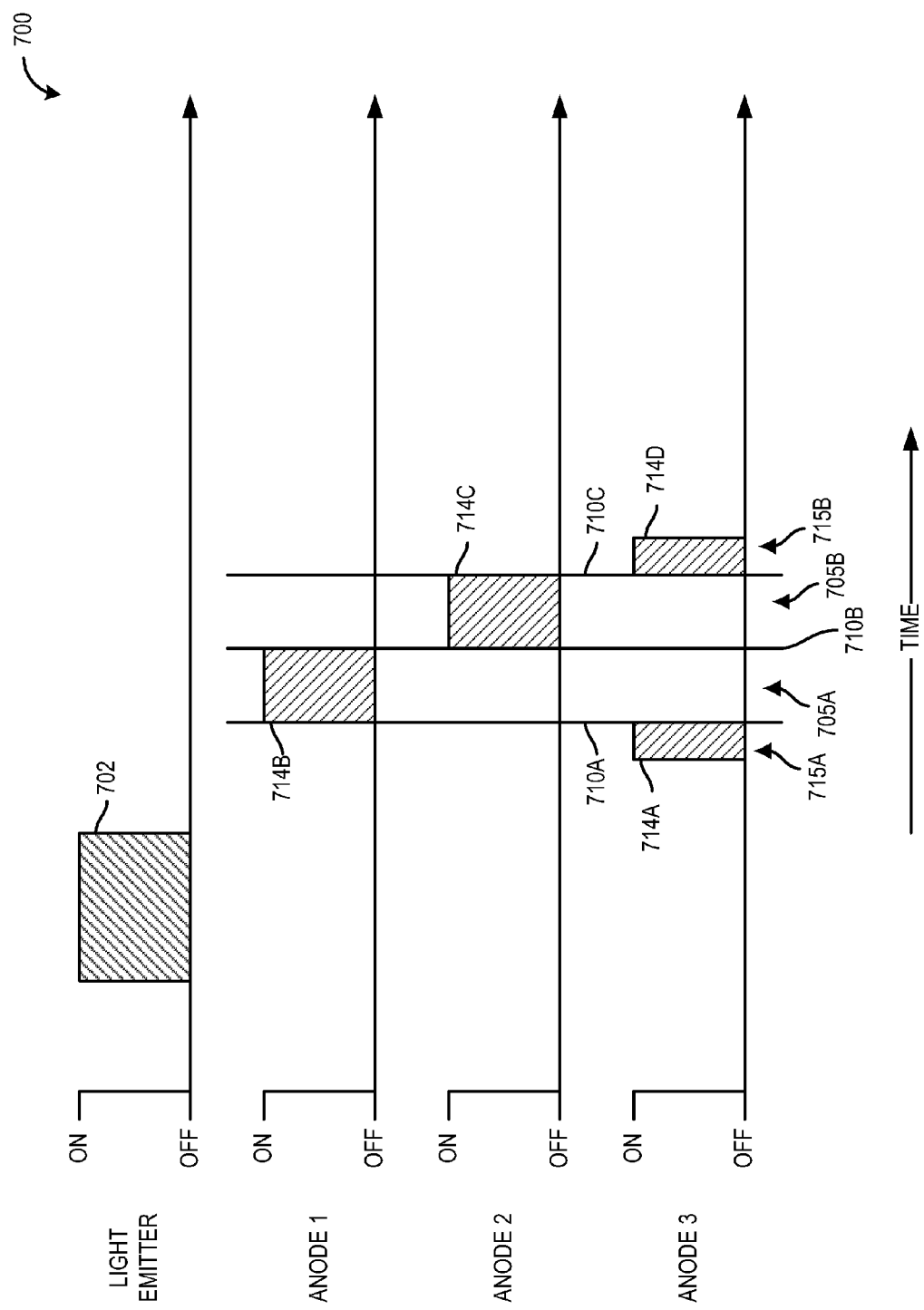
FIG. 6 schematically shows another timing diagram for operating a TOF camera according to an embodiment of the present disclosure.

FIG. 6 shows an example time sequence 700 depicting a light pulse 702 emitted from a light emitter and various return image light collection phases and ambient light collection phases during which three anodes in a single light-sensitive pixel are sequentially activated to collected portions of return image light and portions of ambient light.

In the example shown in FIG. 6, anode 3 (for example, anode 212C of FIG. 2) is activated during ambient light collection phase 715A to collect a first portion of ambient light 714A. At anode switching time 710A, anode 3 is turned off and anode 1 (for example, anode 212A of FIG. 2) is turned on coincident with the start of return image light collection phase 705A. In the example shown in FIG. 6, the transition between anode 3 and anode 1 is immediate, so that there is no gap in light collection at the pixel.

In some embodiments, anode switching time 710A may be based on a predetermined near end point of a distance range for the time-of-flight camera. In the example shown in FIG. 6, anode switching time 710A corresponds to the near end point of a boundary of the distance range for the TOF camera.

As shown in FIG. 6, at anode switching time 710B, anode 1 is turned off and anode 2 (for example, anode 212B of FIG. 2) is turned on. In the example shown in FIG. 6, the transition between anode 1 and anode 2 is immediate, so that there is no gap in light collection at the pixel, potentially avoiding mismatches.

The example shown in FIG. 6 also depicts that, at anode switching time 710C, anode 2 is turned off and anode 3 is turned on. Again, in the example shown in FIG. 6, the transition between anode 2 and anode 3 is immediate, so that there is no gap in light collection at the pixel, potentially avoiding mismatches.

In some embodiments, anode switching time 710C may be based on a predetermined far end point of a distance range for the time-of-flight camera. In the example shown in FIG. 6, anode switching time 710C corresponds to the far end point of the distance range for the TOF camera.

In the example shown in FIG. 6, the third anode collects a first portion of the ambient light immediately before first return image light collection phase 705A and a second portion of the ambient light immediately after the last return image light collection phase, shown in FIG. 6 as return image light collection phase 705B. As a consequence, the sum of return image light collection phases 705A and 705B collects all of return image light and portions of the ambient light 714B and 714C. Because ambient light collection phases 715A and 715B collected portions of ambient light 714A and 714D without collecting any return image light, subtraction of the ambient light collected in ambient light collection phases 715A and 715D from the light collected in return image light collection phases 705A and 705B may remove approximately all of the ambient light.

A separate normalization light pulse and return normalization light collection phase may not be needed. For example, a reflectivity normalization factor may be generated by summing the light collected in return image light collection phases 705A and 705B of FIG. 6.

Continuing with FIG. 3, method 300 comprises, at 314, estimating a distance to the object feature based on one or more of the normalized portions. For example, in embodiments where the return image light is collected in two gating time periods (like return image light collection phases 405A and 405B in FIG. 4 and return image light collection phases 705B and 705C in FIG. 6), a relative quantitative comparison of the two gating time periods may indicate a location of the object within the distance range of the camera. Thus, in one example, distance (D) may be estimated as a function of a first portion of return image light ($R_1$), a second portion of return image light ($R_2$), a total amount of light returned ($R_1+R_2$), a distance range (L), and a fixed constant (c) that depends on the electronic delay of the camera system, as shown in Equation 1 below.

$$D = \frac{L(R_2 - R_1)}{(R_1 + R_2)} + c \quad \text{(Equation 1)}$$

The above is an ideal case with linear behavior. In some cases, the formula may be:

$$D = F1\left(\frac{R_2 - R_1}{R_1 + R_2}\right) + c; \quad \text{(Equation 2)}$$

$$D = F2\left(\frac{R_1}{R_1 + R_2}\right) + c; \quad \text{(Equation 3)}$$

Or other variations of $R_1$ and $R_2$, where F1 and F2 are functions with unique and monotonic values over the practical range. F1 and F2 may be a practical case when pulse shapes are not as symmetrical as shown in FIG. 4 and FIG. 6, so the functions can be close to linear over the practical range, have double slope linearity, or other variations.

In some embodiments, the above described methods and processes may be tied to a computing system including one or more computers. In particular, the methods and processes described herein may be implemented as a computer application, computer service, computer API, computer library, and/or other computer program product.

Returning to FIG. 1, TOF camera 104 includes a logic subsystem 110 and a data-holding subsystem 112. TOF camera 104 may optionally include a display subsystem, communication subsystem, and/or other components not shown in FIG. 1. In other embodiments, the TOF camera may be configured to cooperate with an off-board logic subsystem and/or an off-board data-holding subsystem.

Logic subsystem 110 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 110 may include one or more processors that are configured to execute software instructions. Additionally or alternatively, logic subsystem 110 may include one or more hardware or firmware logic machines configured to execute hardware or firmware instructions. Processors of the logic subsystem may be single-core or multi-core, and the programs executed thereon may be configured for parallel or distributed processing. Logic subsystem 110 may optionally include individual components that are distributed throughout two or more devices, which may be remotely located and/or configured for coordinated processing. One or more aspects of logic subsystem 110 may be virtualized and executed by remotely accessible networked computing devices configured in a cloud computing configuration.

Data-holding subsystem 112 may include one or more physical, non-transitory, devices configured to hold data and/or instructions executable by the logic subsystem to implement the herein described methods and processes.

When such methods and processes are implemented, the state of data-holding subsystem 112 may be transformed (e.g., to hold different data).

It is to be appreciated that data-holding subsystem 112 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of TOF camera 104 that is implemented to perform one or more particular functions. In some cases, such a module, program, or engine may be instantiated via logic subsystem 110 executing instructions held by data-holding subsystem 112. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A time-of-flight light-sensitive pixel in a time-of-flight camera, comprising:
   a hermetically sealed evacuated cavity formed in an insulating substrate;
   a photoelectric cathode for generating electrons responsive to light incident on the time-of-flight light-sensitive pixel in the time-of-flight camera; and
   a plurality of anodes for collecting electrons generated at the photoelectric cathode and passing through the hermetically sealed evacuated cavity.

2. The time-of-flight light-sensitive pixel in the time-of-flight camera of claim 1, wherein the plurality of anodes are configured to, during a first collection phase, collect a first portion of the light incident on the time-of-flight light-sensitive pixel at a first anode of the time-of-flight light-sensitive pixel, and during a second collection phase, collect a second portion of the light incident on the time-of-flight light-sensitive pixel at a second anode of the time-of-flight light-sensitive pixel, the second collection phase immediately following the first collection phase.

3. The time-of-flight light-sensitive pixel in the time-of-flight camera of claim 1, further comprising:
   an optically transparent component disposed above the hermetically sealed evacuated cavity; and
   a seal for sealing the optically transparent component to the insulating substrate.

4. The time-of-flight light-sensitive pixel in the time-of-flight camera of claim 3, wherein the photoelectric cathode comprises a layer of photoelectric material deposited on an evacuated side of the optically transparent component.

5. The time-of-flight light-sensitive pixel in the time-of-flight camera of claim 1, wherein each anode is electrically connected with a respective collector circuit.

6. The time-of-flight light-sensitive pixel in the time-of-flight camera of claim 5, wherein each collector circuit electrically connected to a particular anode comprises:
   a gate input node electrically connected with that particular anode for biasing that particular anode;
   an amplifier electrically connected with the gate input node for amplifying current received at that particular anode;
   an output node electrically connected to the amplifier for carrying current to a light collection module;
   a selector node electrically connected to the amplifier and the output node for selectively switching current flow through the output node; and
   a reset node for selectively resetting that particular anode.

7. The time-of-flight light-sensitive pixel in the time-of-flight camera of claim 5, wherein each collector circuit is electrically connected to a power supply configured to selectively activate each of the plurality of anodes individually.

8. The time-of-flight light-sensitive pixel in the time-of-flight camera of claim 5, wherein the hermetically sealed evacuated cavity is formed on a first side of a silicon substrate, and wherein the collector circuits are formed on an opposite side of the silicon substrate, each collector circuit being electrically connected with a particular anode with an interconnect passing through a via.

9. A method for operating a time-of-flight camera, the method comprising:
   emitting an image light pulse from a light source of the time-of-flight camera, the light source configured to illuminate an object with image light;
   during a first collection phase, collecting a first portion of return image light at a first anode of a light-sensitive pixel, the return image light comprising image light reflected by the object;
   during a second collection phase, collecting a second portion of the return image light at a second anode of the light-sensitive pixel;
   normalizing the first and second portions of the return image light with a normalization factor; and
   estimating a distance to the object based on one or more of the normalized first and second portions of the return image light.

10. The method of claim 9, wherein the second collection phase immediately follows the first collection phase.

11. The method of claim 9, further comprising generating the normalization factor by:
   emitting a normalization light pulse from the light source of the time-of-flight camera;
   at one of the anodes of the light-sensitive pixel, collecting return normalization light; and
   defining the normalization factor based on the return normalization light collected.

12. The method of claim 9, further comprising collecting ambient light at a third anode of the light-sensitive pixel.

13. The method of claim 12, wherein the third anode collects a first portion of the ambient light immediately before the first collection phase and a second portion of the ambient light immediately after the second collection phase.

14. The method of claim 9, wherein a start time for the first collection phase is based on a predetermined near end point of a distance range for the time-of-flight camera and wherein an end time for the second collection phase is based on a predetermined far end point of the distance range.

15. A time-of-flight camera, comprising:
a light source for illuminating an object with image light;
a plurality of time-of-flight light-sensitive pixels for collecting return image light reflected by the object, each time-of-flight light-sensitive pixel comprising:
a photoelectric cathode for generating electrons responsive to return image light incident on a corresponding time-of-flight light-sensitive pixel, and
a plurality of anodes for collecting electrons generated at the photoelectric cathode and passing through a hermetically sealed evacuated cavity between the photoelectric cathode and the plurality of anodes.

16. The time-of-flight camera of claim 15, further comprising a light collection module configured to:
during a first collection phase, collect a first portion of the return image light at a first anode of a corresponding time-of-flight light-sensitive pixel; and
during a second collection phase, collect a second portion of the return image light at a second anode of the corresponding time-of-flight light-sensitive pixel, the second collection phase immediately following the first collection phase.

17. The time-of-flight camera of claim 16, wherein a start time for the first collection phase is based on a predetermined near end point of a distance range for the time-of-flight camera and wherein an end time for a last collection phase is based on a predetermined far end point of the distance range.

18. The time-of-flight camera of claim 15, further comprising a power supply configured to selectively activate each of the plurality of anodes individually.

19. The time-of flight camera of claim 16, wherein each anode is electrically connected with a respective collector circuit, each collector circuit comprising:
a gate input node electrically connected with a particular anode for biasing that particular anode;
an amplifier electrically connected with the gate input node for amplifying current received at that particular anode;
an output node electrically connected to the amplifier for carrying current to the light collection module;
a selector node electrically connected to the amplifier and the output node for selectively switching current flow through the output node; and
a reset node for selectively resetting that particular anode.

* * * * *